United States Patent [19]

Sato

[11] Patent Number: 4,788,616
[45] Date of Patent: Nov. 29, 1988

[54] TAPE CASSETTE LOADING AND UNLOADING APPARATUS COMPRISING HOLDER MOVING MEANS AND MOVEMENT SYNCHRONIZING MECHANISM

[75] Inventor: Manabu Sato, Yokohama, Japan

[73] Assignee: Victor Company of Japan, Ltd., Yokohama, Japan

[21] Appl. No.: 823,050

[22] Filed: Jan. 27, 1986

[30] Foreign Application Priority Data

| Jan. 28, 1985 [JP] | Japan | 60-13908 |
| Jan. 29, 1985 [JP] | Japan | 60-10705 |
| Jan. 29, 1985 [JP] | Japan | 60-10706 |
| Jan. 29, 1985 [JP] | Japan | 60-10707 |
| Jan. 29, 1985 [JP] | Japan | 60-10708 |
| Jan. 29, 1985 [JP] | Japan | 60-10709 |

[51] Int. Cl.$^4$ .................. G11B 5/008; G11B 15/00; G11B 17/00
[52] U.S. Cl. ............................ 360/96.5; 360/95
[58] Field of Search ............... 360/96.5, 85, 95, 93, 360/96.1

[56] References Cited

U.S. PATENT DOCUMENTS

| 4,227,224 | 10/1980 | Umezawa et al. | 360/96.5 |
| 4,631,607 | 12/1986 | Katsumato | 360/96.5 |

FOREIGN PATENT DOCUMENTS

| 1073884 | 3/1980 | Canada | 360/96.5 |
| 0114409 | 5/1978 | Japan | 360/93 |
| 0205850 | 12/1982 | Japan | 360/96.5 |
| 0088860 | 5/1983 | Japan | 360/96.5 |
| 0108052 | 6/1983 | Japan | 360/96.5 |
| 0175268 | 9/1985 | Japan | 360/96.5 |

Primary Examiner—Stuart N. Hecker
Assistant Examiner—David J. Severin
Attorney, Agent, or Firm—Michael N. Meller

[57] ABSTRACT

A tape cassette loading and unloading apparatus loads and unloads a tape cassette in and from a recording and/or reproducing apparatus. The tape cassette has an approximately rectangular parallelepiped shape with top and bottom surfaces respectively having a longer side and a shorter side and a lid provided on a front of the tape cassette. The loading and unloading apparatus comprises a frame, a holder movably provided within the frame for receiving and moving the tape cassette, a mechanism for moving the holder to an insertion completion position and then to a predetermined loading position during a tape cassette loading mode when the tape cassette is inserted into the holder in a cassette receiving position from one side surface of the tape cassette having the shorter side and pushes the holder slightly past the cassette receiving position and for moving the holder from the predetermined loading position to the cassette receiving position via the insertion completion position during a tape cassette ejecting mode, and a member integrally provided on the frame for engaging and opening the lid as the holder is moved from the insertion completion position to the predetermined loading position.

9 Claims, 7 Drawing Sheets

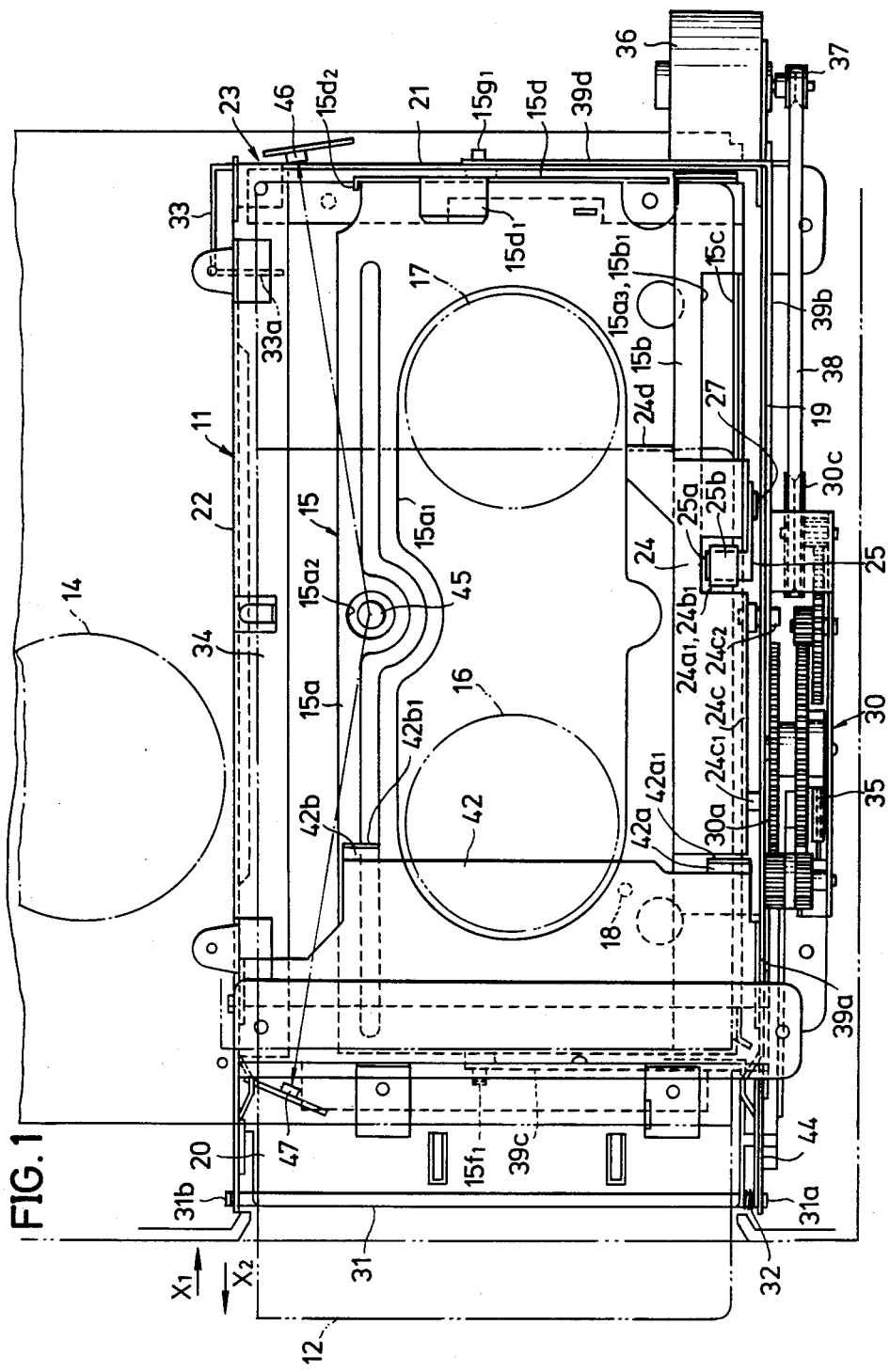

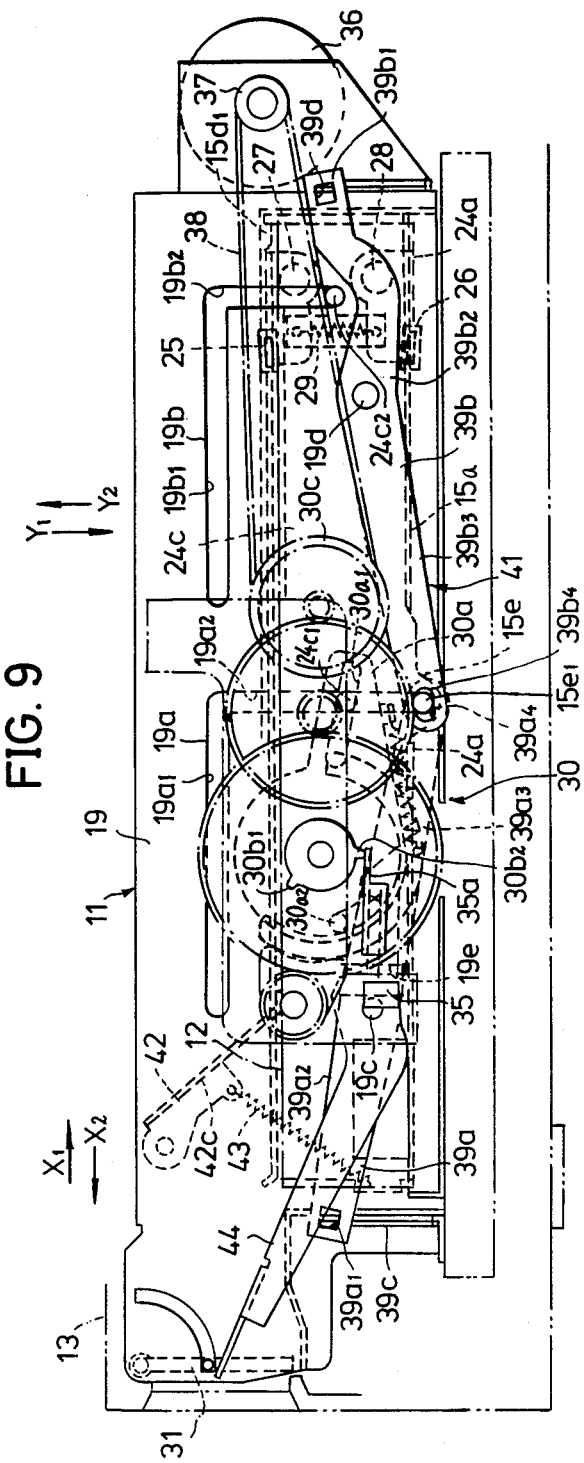

TAPE CASSETTE LOADING AND UNLOADING APPARATUS COMPRISING HOLDER MOVING MEANS AND MOVEMENT SYNCHRONIZING MECHANISM

BACKGROUND OF THE INVENTION

The present invention generally relates to tape cassette loading and unloading apparatuses, and more particularly to a tape cassette loading and unloading apparatus provided in a magnetic recording and/or reproducing apparatus and having a holder which is inserted with a tape cassette and is moved into a predetermined loading position so that the tape cassette is loaded into a loading position where a magnetic recording or reproduction is carried out with respect to a magnetic tape accommodated within the tape cassette.

Generally, a tape cassette loading and unloading apparatus employed in a recording and/or reproducing apparatus (hereinafter referred to as a video tape recorder or simply VTR) has a holder which is inserted with a tape cassette. The tape cassette has an approximately rectangular parallelepiped shape with top and bottom surfaces respectively having a longer side and a shorter side, and a lid is provided on a front of the tape cassette along the longitudinal direction thereof. The tape cassette is inserted into the holder from the front of the tape cassette, and the holder moves the tape cassette into a predetermined loading position within the VTR. The VTR has a front face with an inserting opening through which the tape cassette is inserted, and this inserting opening has a width which is slightly larger than the longer side of the tape cassette. A plurality of manipulation switches for setting an operation mode of the VTR are also provided on the front face thereof.

When downsizing the conventional VTR having the above described construction, the manipulation switches are downsized so as to reduce a mounting space which is required on the front face of the VTR in order to mount the manipulation switches. However, in order to ensure satisfactory manipulation of the manipulation switches, there is a limit to the downsizing of the manipulation switches themselves. In addition, even when the manipulation switches are downsized, adjacent manipulation switches must be separated by a predetermined distance so as to prevent an erroneous manipulation of the manipulation switches, and there is therefore a limit to the downsizing of the mounting space on the front face of the VTR. Further, since the tape cassette is inserted into the VTR from the front of the tape cassette, the inserting opening on the front face of the VTR must have a width which is slightly larger than the longer side of the tape cassette. As a result, the front face of the VTR must at least have such an area that the inserting opening and the manipulation switches can be provided on the front face, and there is a problem in that there is a limit to the downsizing of the front face of the VTR.

SUMMARY OF THE INVENTION

Accordingly, it is a general object of the present invention to provide a novel and useful tape cassette loading and unloading apparatus in which the problems described heretofore are eliminated.

Another and more specific object of the present invention is to provide a tape cassette loading and unloading apparatus comprising a holder which is inserted with a tape cassette having an approximately rectangular parallelepiped shape with top and bottom surfaces respectively having a longer side and a shorter side, from one side surface of the tape cassette having the shorter side, and a lid opening mechanism for opening a lid provided on a front of the tape cassette. According to the loading and unloading apparatus of the present invention, the tape cassette is inserted into the holder in the longitudinal direction of the tape cassette, and thus, the tape cassette can stably be inserted into an insertion completion position within the loading and unloading apparatus without deviating from the insertion completion position. Further, an inserting opening in a front face of a recording and/or reproducing apparatus (VTR) through which the tape cassette is inserted into the loading and unloading apparatus only needs to have a width which is slightly larger than the shorter side of the tape cassette, and it is possible to considerably reduce the area of the front face of the VTR and therefore effectively downsize the VTR.

Still another object of the present invention is to provide a tape cassette loading and unloading apparatus comprising a holder which has a projecting pin on a bottom plate thereof for engaging a groove formed in a bottom surface of the inserted tape cassette which is inserted into the holder from the one side surface of the tape cassette having the shorter side. The groove is provided at a position offset from the center of the shorter side of the tape cassette. According to the loading and unloading apparatus of the present invention, the projecting pin prevents the tape cassette from being erroneously inserted into the holder facing an incorrect direction. In addition, the projecting pin guides the tape cassette to the insertion completion position along the cassette inserting direction.

A further object of the present invention is to provide a tape cassette loading and unloading apparatus comprising a lock release mechanism having a contact portion for making contact with a lock release button provided on the one side surface of the inserted tape cassette so as to release the locking of the lid of the tape cassette. According to the loading and unloading apparatus of the present invention, the locking of the lid of the tape cassette can be released by use of the lock release mechanism having a very simple construction.

Another object of the present invention is to provide a tape cassette loading and unloading apparatus comprising a movement synchronizing mechanism for maintaining a horizontal state of the holder when the holder is moved vertically between the insertion completion position and a predetermined loading position. According to the loading and unloading apparatus of the present invention, the lid of the inserted tape cassette can be smoothly opened as the tape cassette is lowered to the predetermined loading position, and moreover, reels of the tape cassette can smoothly engage reel bases of the VTR.

Still another object of the present invention is to provide a tape cassette loading and unloading apparatus comprising holding members for holding the top and bottom surfaces of the inserted tape cassette when the tape cassette is moved to the insertion completion position and then to the predetermined loading position and vice versa. According to the loading and unloading apparatus of the present invention, it is possible to minimize the frictional resistance between the bottom plate of the holder and the bottom surface of the tape cassette, and the tape cassette can be moved smoothly to the insertion completion position and then to the predetermined loading position and vice versa.

A further object of the present invention is to provide a tape cassette loading and unloading apparatus comprising a pushing mechanism for pushing the top surface of the inserted tape cassette when the tape cassette reaches the predetermined loading position. According to the loading and unloading apparatus of the present invention, the inserted tape cassette is positively held in the predetermined loading position without play by the pushing mechanism and the holding members described before.

Other objects and further features of the present invention will be apparent from the following detailed description when read in conjunction with the accompanying drawings.

BRIEF DESCRIPTION OF THE DRAWINGS

FIG. 1 is a plan view showing an embodiment of the tape cassette loading and unloading apparatus according to the present invention;

FIG. 9 is a side view showing the tape cassette in a loading position in the magnetic recording and/or reproducing apparatus.

DETAILED DESCRIPTION

Figure 2A:
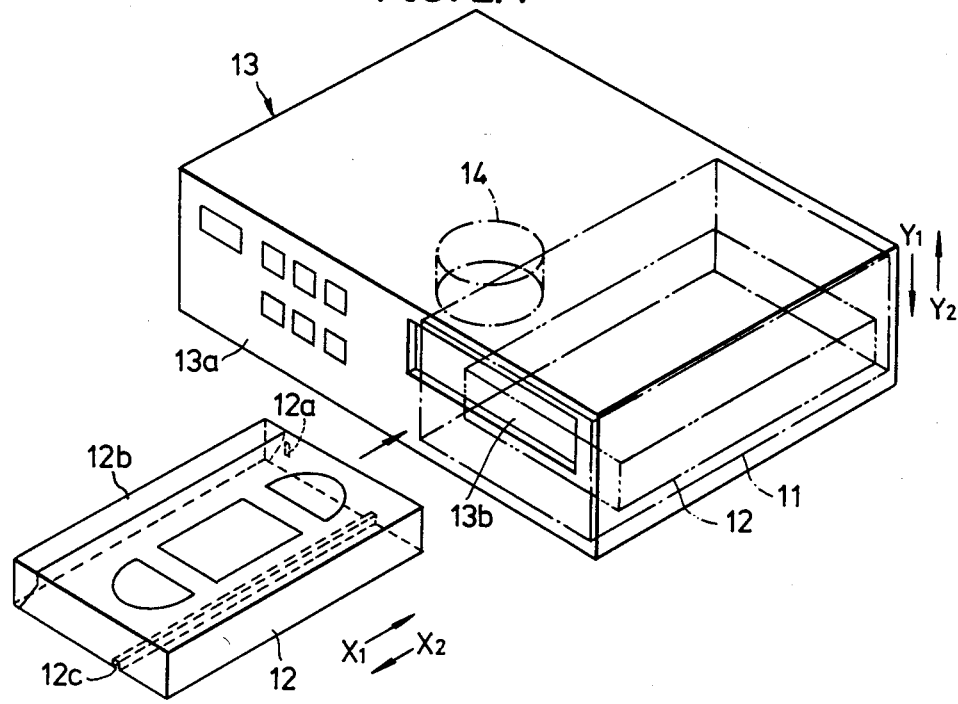
FIGS. 2A and 2B are a perspective view and a side view for respectively explaining a state where a tape cassette is inserted into a magnetic recording and/or reproducing apparatus through an inserting opening.
Figure 2B:
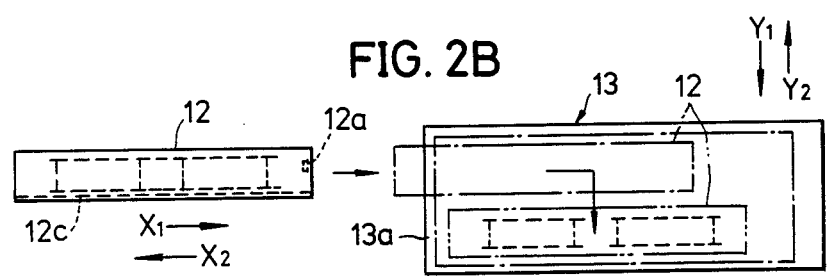

An embodiment of the tape cassette loading and unloading apparatus according to the present invention is shown in FIG. 1. In FIG. 1, a tape cassette loading and unloading apparatus 11 is mounted within a magnetic recording and/or reproducing apparatus (hereinafter simply referred to as a VTR) 13. A tape cassette 12 which is played on the VTR 13 has an approximately rectangular parallelepiped shape with top and bottom surfaces respectively having a longer side and a shorter side. As shown in FIGS. 2A and 2B, the tape cassette 12 comprises a lid lock release button 12a provided on one side surface thereof, a lid 12b provided on a front thereof along the longitudinal direction of the tape cassette 12, and a groove 12c formed on the bottom surface thereof along the longitudinal direction of the tape cassette 12. The groove 12c is provided at a position offset from the center of the shorter side of the tape cassette 12. The loading and unloading apparatus 11 is mounted within the VTR 13 facing such a direction that the loading and unloading apparatus 11 receives the tape cassette 12 which is inserted from the one side surface thereof having the shorter side. As shown in FIG. 2A, the loading and unloading apparatus 11 is arranged on the right of the VTR 13 so that a width of the loading and unloading apparatus 11 along a front face 13a of the VTR 13 is shorter than a depth of the loading and unloading apparatus 11 along a side surface of the VTR 13. Accordingly, an inserting opening 13b on the front face 13a of the VTR 13 for receiving the tape cassette 12 only needs to have a width which is slightly larger than the shorter side of the tape cassette 12.

A rotary drum 14 is provided on the left of the loading and unloading apparatus 11 in FIG. 2A. When the tape cassette 12 is in a predetermined loading position within the VTR 13 and the VTR 13 is put into a recording or reproducing mode, for example, a tape loading operation is performed to wrap a magnetic tape (not shown) accommodated within the tape cassette 12 around an outer peripheral surface of the rotary drum 14 over a predetermined angular range. When the tape cassette 12 is inserted into the VTR 13 through the inserting opening 13b from the one side surface thereof having the release button 12a so that the lid 12b is on the left, the tape cassette 12 is carried from a position indicated by a one-dot chain line in FIG. 2B to the predetermined loading position indicated by a two-dot chain line.

As shown in FIGS. 1, 3, 4, and 5, a holder 15 of the loading and unloading apparatus 11 for receiving the inserted tape cassette 12 is open on the left side thereof, that is, on the left side thereof facing the rotary drum 14 so that the tape loading operation can be performed without being interfered by the holder 15. The holder 15 comprises a bottom plate 15a on which the inserted tape cassette 12 rests, a top plate 15b which faces the top surface of the inserted tape cassette 12, and a side plate 15c connecting the top and bottom plates 15b and 15a. Hence, the holder 15 substantially has a sideways U-shape cross section when viewed in a tape cassette inserting direction X1.

The bottom plate 15a is provided with a generally oval opening 15a1 into which a supply reel base 16 and a take-up reel base 17 of the VTR 13 relatively enter, and a hole 15a2 into which a tape end detection lamp 45 of the VTR 13 enters. A projecting pin 18 is also provided on the top surface of the bottom plate 15a at a position deviated from an imaginary line which passes a center of the loading and unloading apparatus 11 and extends along the longitudinal direction of the loading and unloading apparatus 11. The projecting pin 18 engages with the groove 12c of the tape cassette 12 when the tape cassette 12 is inserted into the VTR 13. The projecting pin 18 prevents the tape cassette 12 from being inserted into the VTR 13 facing an incorrect direction, and also guides the inserted tape cassette 12.

A plate part 15d of the bottom plate 15a extends in a direction Y2. This plate part 15d has a bent portion 15d1 which extends in a direction X2 and opposes the top surface of the inserted tape cassette 12, and a bent contact portion 15d2 which also extends in the direction X2 for making contact with the release button 12a of the inserted tape cassette 12. In other words, the contact portion 15d2 is simply a bent integral portion of the plate part 15d of the holder 15 and projects in the direction X2 so as to oppose the release button 12a of the inserted tape cassette 12. Hence, there is no need to provide a complex lock release mechanism, and the construction of the VTR 13 becomes simple and the VTR 13 can be manufactured at a low cost. The bottom plate 15a has three downwardly projecting portions 15e, 15f, and 15g which project in the direction Y1 from the bottom surface of the bottom plate 15a. The projecting portions 15e, 15f, and 15g respectively have pins 15e1, 15f1, and 15g1 which project outwardly of the holder 15.

Figure 3:
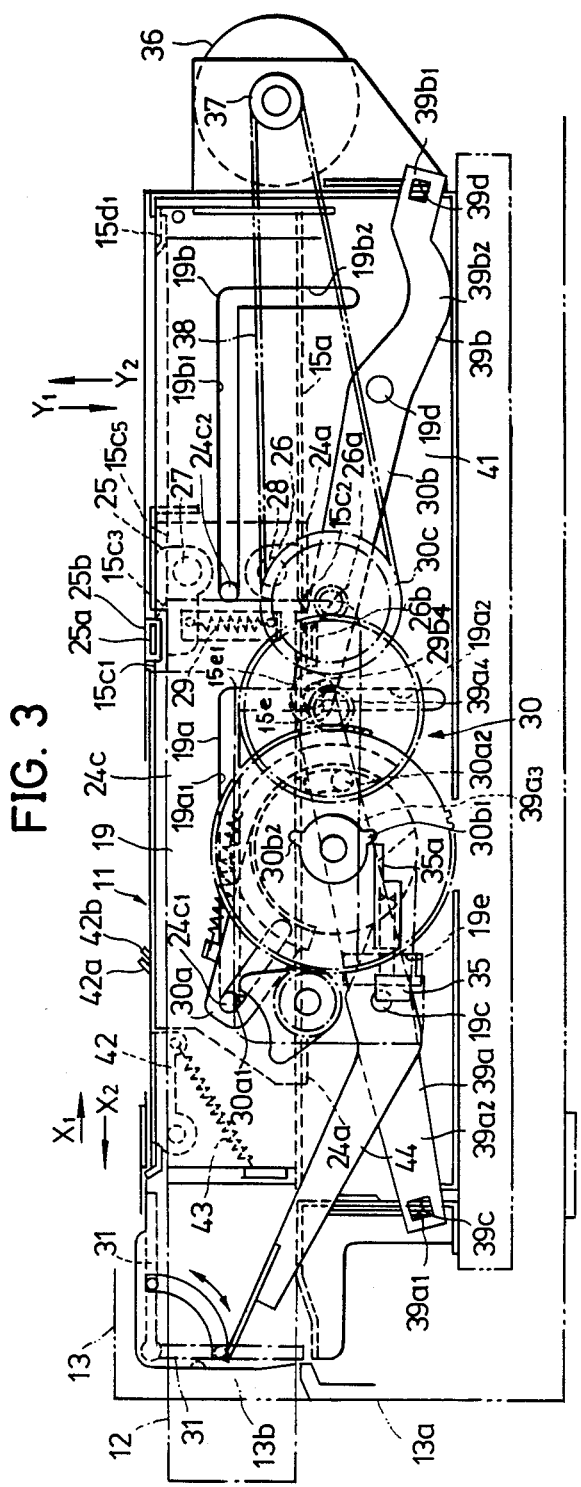
FIGS. 3, 4, and 5 are a side view, a front view, and a rear view respectively showing the tape cassette loading and unloading apparatus shown in FIG. 1.
Figure 4:
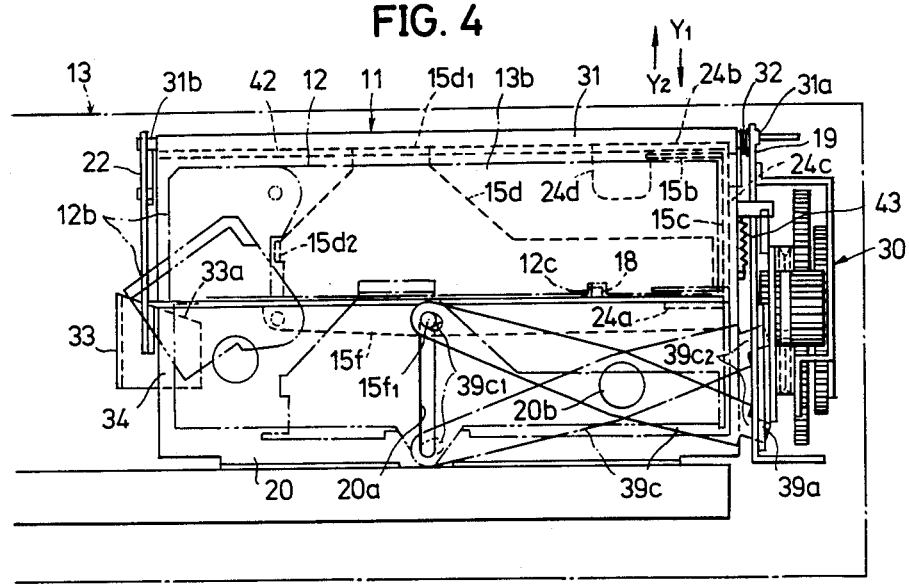
Figure 5:
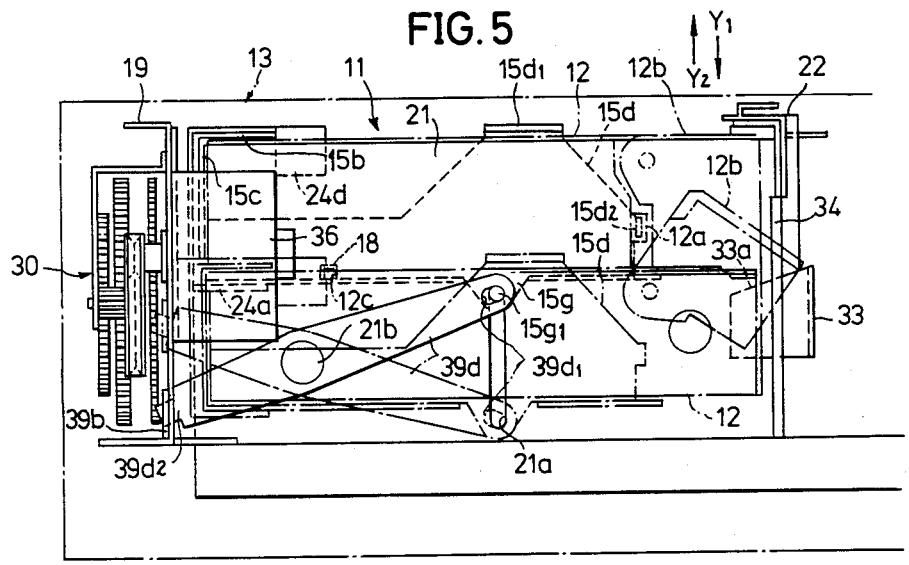
Figure 6:
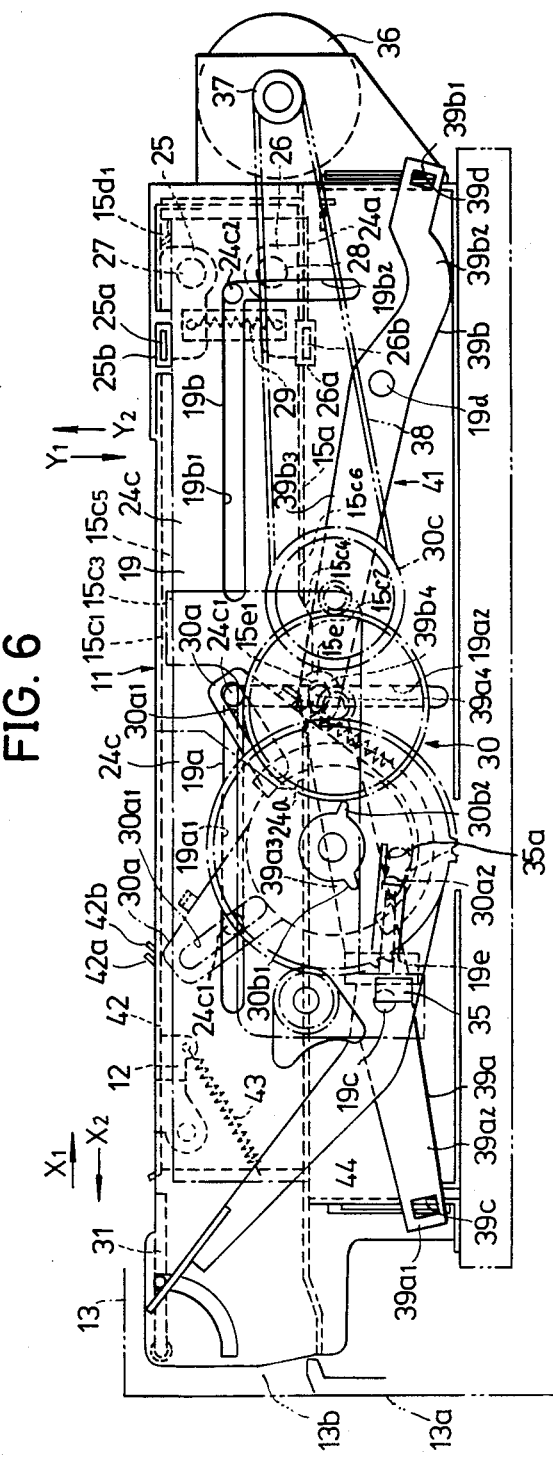
FIG. 6 is a side view showing the tape cassette in a fully inserted position in the tape cassette loading and unloading apparatus.

As shown in FIGS. 1 and 2B, the tape cassette 12 inserted in the holder 15 is supported within a rectangular frame 23 and is movable horizontally between a cassette receiving position shown in FIG. 3 where the tape cassette 12 is received and an insertion completion position shown in FIG. 6 and is movable vertically between the insertion completion position and the predetermined loading position shown in FIG. 9. When the tape cassette 12 is manually inserted in the cassette inserting direction X1 into the holder 15 in the cassette receiving position from one side surface of the tape cassette having the shorter side and is pushed slightly past the cassette receiving position toward the insertion completion position, the tape cassette 12 is automatically moved to the predetermined loading position via the insertion completion position as will be described later. The frame 23 is constituted by brackets 19 through 22 which are connected to each other. As shown in FIGS. 3, 4, and 5, the bracket 19 has an L-shaped guide groove 19a for guiding the pin 15e1, the bracket 20 has a guide groove 20a for guiding the pin 15f1, and the bracket 21 has a guide groove 21a for guiding the in 15g1. The holder 15 slides upwardly and downwardly in a state where the pins 15e1, 15f1, and 15g1 are respectively guided within the guide grooves 19a, 20a, and 21a.

A slide member 24 comprises a bottom part 24a which opposes the bottom surface of the bottom plate 15a of the holder 15, a top part 24b which opposes the upper surface of top plate 15b, and a side part 24c which opposes the outer surface of the side plate 15c as shown in FIG. 4. The slide member 24 substantially has a sideways U-shape cross section when viewed in the tape cassette inserting direction X1. The slide member 24 slides in the directions X1 and X2 along the outer side of the holder 15 when inserting and extracting the tape cassette 12.

As shown in FIGS. 3 and 4, the side part 24c has on the rear part of the slide member 24 holding members 25 and 26 for respectively holding the top and bottom surfaces of the tape cassette 12 which is inserted into the holder 15 near the one side surface of the tape cassette 12. The slide member 24 has a contact part 24d which is an integral part of the upper part 24b and is formed by bending the upper part 24b downwardly in the direction Y1, and the contact part 24d makes contact with the one side surface of the inserted tape cassette 12. The holding members 25 and 26 are rotatably supported on pins 27 and 28, respectively. The holding members 25 and 26 respectively have bent parts 25a and 26a which enter into respective openings 24a1 and 24b1 in the bottom and top parts 24a and 24b of the slide member 24 so as to oppose the top and bottom surfaces of the inserted tape cassette 12. Rubber bands 25b and 26b are respectively fitted over the bent parts 25a and 26a. The rubber bands 25b and 26b prevent slippage when the tape cassette 12 is held at the top and bottom surfaces thereof and moved, and also prevent the top and bottom surfaces of the tape cassette 12 from being scratched and damaged.

A coil spring 29 is stretched across the holding members 25 and 26, and the holding members 25 and 26 are urged to close upon each other by the pulling force of the coil spring 29.

The top and bottom edges of the side plate 15c of the holder respectively have wide parts 15c1 and 15c2, narrow parts 15c5 and 15c6, and sloping parts 15c3 and 15c4 provided between the wide parts 15c1 and 15c2 and the narrow parts 15c5 and 15c6. The wide, sloping, and narrow parts of the top and bottom edges of the side plate 15c act as cam parts.

Before the tape cassette 12 is inserted into the VTR 13, base parts of the bent parts 25a and 26a make contact with the respective wide parts 15c1 and 15c2 and the holding members 25 and 26 are open against the force exerted by the coil spring 29 so as not to make contact with the top and bottom surfaces of the tape cassette 12. Accordingly, when the slide member 24 slides in the direction X1 as will be described later on in the specification, the bent parts 25a and 26a respectively slide on the wide parts 15c1 and 15c2, the sloping parts 15c3 and 15c4, and the narrow parts 15c5 and 15c6, and the holding members 25 and 26 close upon each other so as to hold the top and bottom surfaces of the tape cassette 12.

Elongated holes 15b1 and 15a3 extending in the directions X1 and X2 are respectively provided in the top and bottom plates 15b and 15a of the holder 15 over a moving range of the bent parts 25a and 26a. Hence, the bent parts 25a and 26a of the holding members 25 and 26 respectively oppose the elongated holes 15a3 and 15b1 of the holder 15 through the openings 24a1 and 24b1 in the slide member 24.

The side part 24c has projecting pins 24c1 and 24c2 projecting outwardly of the slide member 24. The projecting pin 24c1 fits into the L-shaped guide groove 19a, and the projecting pin 24c2 fits into the guide groove 19b. As shown in FIG. 3, the projecting pin 24c1 also engages an elongated hole 30a1 in a rotary arm 30a of a drive transmitting mechanism 30. The drive transmitting mechanism 30 and the slide member 24 constitute a moving mechanism for moving the holding members 25 and 26 which hold the tape cassette 12 in the moving direction (direction X1 or X2) of the tape cassette so as to move the tape cassette 12 together with the holding members 25 and 26.

When the rotary arm 30a rotates, the slide member 24 is guided by the guide grooves 19a and 19b and slides horizontally (directions X1 and X2) on the outside of the holder 15. The slide member 24 moves together with the holder 15 when the slide member 24 moves upwardly and downwardly (directions Y2 and Y1).

As shown in FIG. 4, an opening and closing lid 31 is provided at the inserting opening 13b. Pins 31a and 31b on both sides of the lid 31 are respectively supported by the brackets 19 and 22. A torsion spring 32 fitted over the pin 31a normally keeps the lid 31 in a closed state. The lid 31 is transparent or semi-transparent so that the inside of the loading and unloading apparatus 11 is visible through the front face 13a of the VTR 13.

A lid opening member 33 is a bent part which is integrally formed on the bracket 21. When the inserted tape cassette 12 is lowered to a predetermined loading position within the VRT 13, the lid opening member 33 engages the lower edge of the lid 12b of the tape cassette 12 and opens the lid 12b. The bracket 22 is connected to the upper part of the front bracket 20 and the upper part of the rear bracket 21, and has an opening 34 in a lower part thereof for permitting the tape loading operation to be performed.

A contact member 42 is pivotally supported between the brackets 19 and 22. The contact member 42 comprises a contact part 42a which makes contact with the top surface of the top plate 15b of the holder 15, and a contact part 42b which projects more in the direction X1 compared to the contact part 42a. Tip ends parts 42a1 and 42b1 of the respective contact parts 42a and 42b are bent, and make contact with the top surface of the tape cassette 12 depending on the rotary angle of the contact member 42 when the tape cassette 12 is lowered to the predetermined loading position.

The contact member 42 has a mirror-like surface so that the surface can reflect light. For example, the contact member 42 is made of stainless steel or the surface of the contact member 42 is plated. For this reason, when the tape cassette 12 reaches the predetermined loading position as will be described later, the remaining roll of tape on the supply reel of the tape cassette 12 is projected on a lower surface 42c of the contact member 42.

The contact member 42 is urged to make contact with and push against the top surface of the tape cassette 12 by the force exerted by a coil spring 43 which is stretched across the holder 15 and the contact member 42. The contact member 42 and the coil spring 43 constitute a pushing mechanism.

As shown in FIGS. 3, 4, and 5, an upward and downward movement synchronizing mechanism 41 is provided in the loading and unloading apparatus 11. The synchronizing mechanism 41 links the pins 15e1, 15f1, and 15g1 so that the height position of the holder 15 is maintained constant at the pins 15e1, 15f1, and 15g1 when the holder 15 moves upwardly and downwardly.

The synchronizing mechanism 41 comprises arms 39a and 39b which are pivotally supported on respective pins 19c and 19d of the bracket 19, an arm 39c pivotally supported on a pin 20b of the bracket 20, and an arm 39d pivotally supported on a pin 21b of the bracket 21. The arm 39a has a rectangular hole 39a 1 in a tip end part thereof, an arm portion 39a2 which rotates between the outer side of the bracket 19 and a lid opening lever 44, and an arm portion 39a3 which is bent in the form of a crank toward the inner side of the bracket 19 and extends in the direction X1 by penetrating an opening 19e in the bracket 19. The arm portion 39a3 has an oval hole 39a4 in a tip end thereof, and is rotatable between the inner side of the bracket 19 and the holder 15. Thus, the hole 39a4 of the arm 39a is engaged by the pin 15e1 of the holder 15 on the inner side of the bracket 19.

The arm 39b has a rectangular hole 39b1 in a tip end thereof, an arm portion 39b2 having an arcuate shape so as not to make contact with the pin 24c2 which moves within the guide groove 19b, and an arm portion 39b3 which extends in the direction X2 so that the arm portion 39b3 can rotate between the outer side of the bracket 19 and the drive transmitting mechanism 30. The arm portion 39b3 has an oval hole 39b4 in a tip end thereof. The hole 39b4 of the arm 39b is engged by the pin 15e1 of the holder 15 on the outer side of the bracket 19.

As shown in FIG. 4, the arm 39c has an oval hole 39c1 on one end thereof for engaging the pin 15f1 of the holder 15, and an engaging part 39c2 on the other end thereof for fitting into the rectangular hole 39a1 of the arm 39a a. Similarly, the arm 39d has an oval hole 39d1 on one end thereof for engaging the pin 15g1 of the holder 15, and an engaging part 39d2 on the other end thereof for fitting into the rectangular hole 39b1 in the arm 39b, as shown in FIG. 5.

The pins 15e1, 15f1, and 15g1 are linked to each other by way of the arms 39a, 39b, 39c, and 39d. For this reason, when the holder 15 moves upwardly and downwardly, the arms 39a through 39d are rotationally displaced as will be described later and keep the height positions of the pins 15e1, 15f1, and 15g1 to the same height position so that the bottom plate 15a of the holder 15 is maintained in the horizontal state.

As shown in FIG. 1, a start sensor 46 and an end sensor 47 are respectively provided at the front and the rear of the brackets 21 and 20 for receiving light emitted from the lamp 45 so as to detect an end of the tape accommodated within the tape cassette 12.

Figure 7:
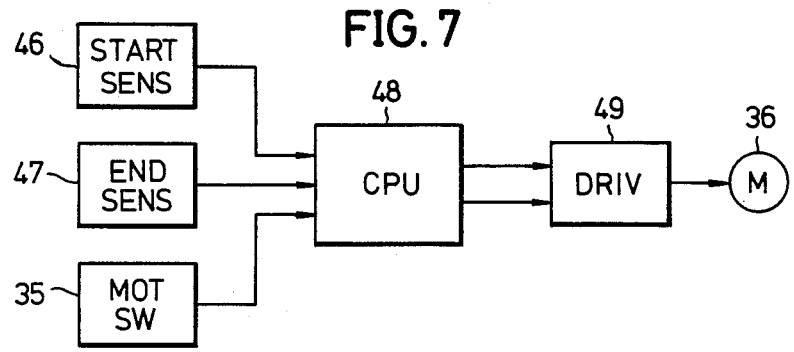
FIG. 7 is a general block diagram showing a circuit for controlling a drive motor.

A central processing unit (CPU) 48 of the VTR 13 generates a motor control signal responsive to outputs of a motor switch 35 provided on the bracket 19 and the sensors 46 and 47. As shown in FIG. 7, the motor control signal is passed through a motor driving circuit 49 and is supplied to a drive motor 36 so as to control the drive motor 36.

Next, description will be given with respect to the operation of the loading and unloading apparatus 11 having the construction described heretofore when the tape cassette 12 is inserted into the loading and unloading apparatus 11 (VTR 13).

As shown in FIGS. 2A and 2B, the tape cassette 12 is inserted into the inserting opening 13b from the one side surface of the tape cassette 12 provided with the release button 12a, and is pushed in the inserting direction X1. Hence, the lid 31 at the inserting opening 13b is pushed by the one side surface of the tape cassette 12 and is opened against the force exerted by the torsion spring 32, and the tape cassette 12 is inserted into the holder 15.

As shown in FIG. 1, the projecting pin 18 on the bottom plate 15a fits into the groove 12c on the bottom surface of the tape cassette 12 when the tape cassette 12 is inserted into the holder 15, and an erroneous insertion of the tape cassette 12 facing an incorrect direction is prevented.

The tape cassette 12 is permitted to be inserted into the holder 15 in the cassette receiving position only when the projecting pin 18 can fit into the groove 12c of the tape cassette. The projecting pin 18 positively prevents the tape cassette 12 from being inserted facing the incorrect direction because the projecting pin 18 will not coincide with the groove 12c when the tape cassette 12 is inserted facing the incorrect direction.

The tape cassette 12 is inserted in the direction X1 under the guidance of the projecting pin 18 and makes contact with the contact part 24d of the slide member 24.

Therefore, when the tape cassette 12 is inserted in the direction X1, the projecting pin 18 relatively slides within the groove 12c and guides the tape cassette 12 in the inserting direction X1, and the tape cassette 12 is inserted into a predetermined inserting position without positionally deviating toward the open side of the holder 15.

Before the tape cassette 12 is inserted into the holder 15, the holding members 25 and 26 are in such an open state that the base parts of the bent parts 25a and 26a are in contact with the respective wide parts 15c1 and 15c2 of the holder 15. In other words, the bent parts 25a and 26a of the holding members 25 and 26 respectively separate upwardly and downwardly through the elongated holes 15a3 and 15b1 of the holder 15 and enter within the openings 24a1 and 24b1 in the slide member 24. Hence, the bent parts 25a and 26a are separated from the top and bottom surfaces of the inserted tape cassette 12, respectively. As a result, the holding members 25 and 26 will not interfere with the insertion of the tape cassette 12 into the holder 15.

When the tape cassette 12 is inserted into the holder 15, the lower surface of the contact part 42a of the contact member 42 makes contact with the top surface of the holder 15 and the contact member 42 is rotated counterclockwise in FIG. 3. For this reason, the contact member 42 is displaced to a position where the contact member 42 does not interfere with the insertion of the tape cassette 12.

When the other side surface of the tape cassette 12 is pushed to a position where this other side surface of the tape cassette 12 substantially coincides with the front face 13a of the VTR 13, the slide member 24 is pushed by the tape cassette 12 and is slid in the direction X1.

As the slide member 24 slides in the direction X1, the bent parts 25a and 26a of the holding members 25 and 26 respectively move from the wide parts 15c1 and 15c2, pass the sloping parts 15c3 and 15c4, and reach the narrow parts 15c5 and 15c6. Due to the action of the spring 29, the bent parts 25a and 26a respectively enter the elongated holes 15a3 and 15b1 of the holder 15 through the openings 24a1 and 24b1 so as to close upon each other. Accordingly, the top and bottom surfaces of the tape cassette 12 are respectively held by the rubber bands 25b and 26b which are provided on the bent parts 25a and 26a of the holding members 25 and 26.

Next, as shown in FIG. 6, the pin 24c1 rotates the rotary arm 30a clockwise as the slide member 24 slides in the direction X1, and a cam part 30b1 of the drive transmitting mechanism 30 makes contact with a contact piece 35a of the motor switch 35 so as to close the motor switch 35. In other words, the motor switch 35 is closed when the tape cassette 12 is manually inserted slightly past the cassette receiving position toward the insertion completion position.

Figure 8A:
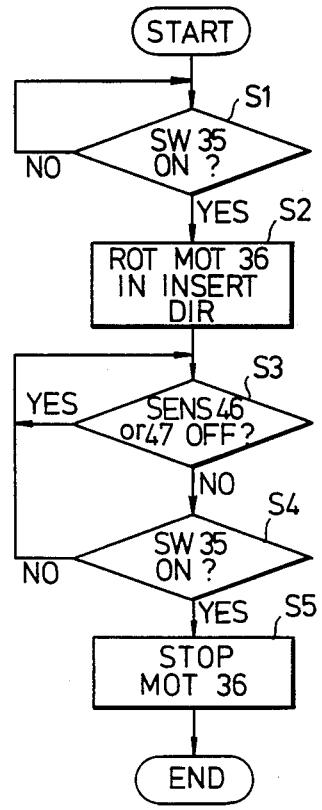
FIG. 8A is a flow chart for explaining an opertion of a central processing unit when the tape cassette is inserted into the magnetic recording and/or reproducing apparatus.

When the tape cassette 12 is inserted into the loading and unloading apparatus 11 in this manner, the CPU 48 performs the process shown in FIG. 8A. A step S1 discriminates whether or not the tape cassette 12 is inserted and the motor switch 35 is closed (ON). When the discrimination result in the step S1 is YES, a step S2 generates a signal for rotating the motor 36 in a cassette inserting direction and supplies this signal to the motor driving circuit 49.

The drive motor 36 mounted on the end part of the bracket 19 is rotated responsive to the closing of the motor switch 35, and the rotational force of the motor 36 is transmitted by way of a pulley 37 and a belt 38 to a pulley 30c of the drive transmitting mechanism 30.

The rotary arm 30a is rotated clockwise by the rotational force of the motor 36 which is transmitted by way of a gear mechanism of the drive transmitting mechanism 30, and moves the slide member 24 to the insertion completion position shown in FIG. 6. The tape cassette 12 is moved in the direction X1 together with the slide member 24 in the state where the top and bottom surfaces of the tape cassette 12 are respectively held by the holding members 25 and 26.

Since the holding members 25 and 26 respectively hold the top and bottom surfaces of the tape cassette 12, the pushing forces of the holding members 25 and 26 act in mutually opposite directions and cancel each other. Accordingly, when the tape cassette 12 is moved to the insertion completion position together with the slide member 24, the frictional resistance acting between the bottom plate 15a of the holder 15 and the bottom surface of the tape cassette 12 is only due to the weight of the tape cassette 12 itself. For this reason, the tape cassette 12 can be moved smoothly by a relatively small force.

In addition, when the tape cassette 12 is moved to the insertion completion position in the state where the top and bottom surfaces of the tape cassette 12 are respectively held by the holding members 25 and 26, the projecting pin 18 engages with the groove 12c of the tape cassette 12 and guides the tape cassette 12 in the direction X1. Thus, although the tape cassette 12 is drawn into the holder 15 in the state where the holding members 25 and 26 respectively hold the top and bottom surfaces of the tape cassette 12 only in the vicinity of the rear of the tape cassette 12, the tape cassette 12 will not positionally deviate in directions other than the direction X1.

When the tape cassette 12 is drawn into the holder 15 and reaches the insertion completion position, the release button 12a of the tape cassette 12 makes contact with the contact portion 15d2 and is pushed to a lock release position. Further, the top surface of the tape cassette 12 in the vicinity of the one side surface thereof opposes the bent portion 15d1. When the release button 12a is pushed by the contact portion 15d2, the locking of the lid 12b is released.

As the rotary arm 30a further rotates clockwise in FIG. 3, the pins 24c1 and 24c2 of the slide member 24 respectively move along horizontal parts 19a1 and 19b1 to vertical parts 19a2 and 19b2 of the guide grooves 19a and 19b.

As shown in FIG. 9, the tape cassette 12 within the holder 15 is lowered in the direction Y1 to the predetermined loading position together with the slide member 24 which moves along the guide grooves 19a and 19b. As the holder 15 is lowered from the insertion completion position shown in FIG. 6 to the predetermined loading position shown in FIG. 9, the pin 15e1 of the holder 15 is guided by the vertical part 19a2 of the guide groove 19a and moves downwardly in the direction Y1. Due to the downward movement of the pin 15e1, the arms 39a and 39b which are inserted with the pin 15e1 respectively rotate clockwise and counterclockwise about the respective pins 19c and 19d. The arms 39c and 39d which respectively engage with the arms 39a and 39b rotate from respective positions indicated by one-dot chain lines in FIGS. 4 and 5 due to the rotation of the arms 39a and 39b.

Accordingly, as the pin 15e1 of the holder 15 moves downwardly, the arms 39a through 39d move the pins 15f1 and 15g1 downwardly while maintaining the pins 15f1 and 15g1 at the same height position as the pin 15d1. That is, the holder 15 is stably lowered to the predetermined loading position with the bottom plate 15a maintained in the horizontal state at the cental part of the longer side of the bottom plate 15a and at the central part of the two shorter sides of the bottom plate 15a. The spring 43 is pulled when the holder 15 containing the inserted tape cassette 12 is lowered in the direction Y1. In addition, the contact member 42 rotates clockwise as the holder 15 moves downardly, and the contact portion 42b makes contact with the top surface of the tape cassette 12.

The contact portion 42a slightly separates from the top plate 15b of the holder 15, and only the tip end part 42b1 of the contact portion 42b is urged by the spring 43 and pushes the tape cassette 12 downwardly. Hence, the tape cassette 12 in the predetermined loading position is held by the holding members 25 and 26 in the vicinity of the rear of the tape cassette 12, and the contact member 42 pushes the tape cassette 12 in the vicinity of the front of the tape cassette 12. As a result, the tape cassette 12 is held in the predetermined loading position without play. For this reason, the tape loading operation can be smoothly and stably performed by tape loading members (not shown) so that the tape is drawn out of the tape cassette 12 and wrapped around the outer peripheral surface of the rotary drum 14 over the predetermined angular range.

The remaining roll of tape on the supply reel of the tape cassette 12 which is in the predetermined loading position is projected on the lower surface 42c of the contact member 42. Hence, the remaining roll of tape on the supply reel can be seen through the lid 31 provided at the inserting opening 13b.

When the holder 15 reaches the predetermined loading position, the lid 12b is opened, the pin 24c2 makes contact with the end of the vertical part 19b2 of the guide groove 19b, and a cam part 30b2 of the drive transmitting mechanism 30 closes the motor switch 35. The holder 15 is locked in the predetermined loading position by a lock mechanism (not shown) provided in the drive transmitting mechanism 30.

When the tape cassette 12 moves downwardly, the lower edge of the lid 12b makes contact with a sloping surface 33a of the lid opening member 33, and the lid 12b is relatively pushed upwardly and opened. As the lid 12b makes contact with the lid opening member 33, the tape cassette 12 contained in the holder 15 is held by the holding members 25 and 26, and the tape cassette 12 is stably lowered in the horizontal state due to the operation of the synchronizing mechanism 31. Thus, the lid 12b is stably opened as the holder 15 is lowered.

A positioning pin (not shown) provided on a chassis of the VTR 13 relatively makes contact with the bottom surface of the tape cassette 12 when the tape cassette 12 is lowered to the predetermined loading position, and the tape cassette 12 in the predetermined loading position is slightly separated from the bottom surface 15a of the holder 15. However, because the holding members 25 and 26 are supported on the pins 27 and 28 and are rotatable with respect to the slide member 24, the holding members 25 and 26 rotate and keep holding the top and bottom surfaces of the tape cassette 12 even when the tape cassette 12 in the predetermined loading position slightly moves upwardly within the holder 15. Accordingly, the tape cassette 12 is stably loaded into the predetermined loading position in the state where the tape cassette 12 is held by the holding members 25 and 26.

Further, the force exerted by the coil spring 43 provided on the holder 15 acts on the contact member 42, and the contact member 42 rotates clockwise as the holder 15 moves downwardly. For this reason, the top surface of the tape cassette 12 in the predetermined loading position is pushed by the contact portions 42a and 42b of the contact member 42 which is urged by the spring 43, and the tape cassette 12 is maintained in the predetermined loading position without play.

When the tape cassette 12 reaches the predetermined loading position, the light emitted from the lamp 45 is blocked by the tape within the tape cassette 12. The CPU 48 discriminates in a step S3 shown in FIG. 8A whether or not the start sensor 46 or the end sensor 47 is OFF, that is, whether or not it is impossible to detect the light from the lamp 45. When the discrimination result in the step S3 is NO, a step S4 discriminates whether or not the motor switch 35 is turned ON again. When the discrimination result in the step S4 is YES, a stop signal is supplied to the motor driving circuit 49 to stop the rotation of the drive motor 36.

Figure 8B:
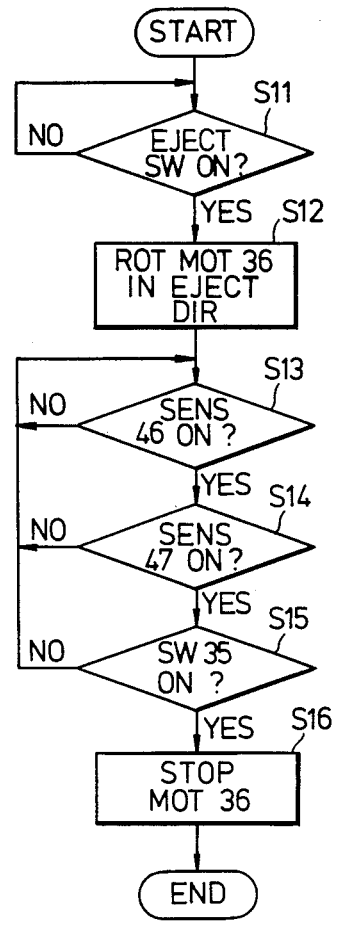
FIG. 8B is a flow chart for explaining the operation of the central processing unit when the tape cassette is ejected from the magnetic recording and/or reproducing apparatus.

Next, in an eject mode, the CPU 48 performs the process shown in FIG. 8B. A step S11 discriminates whether or not in eject switch (not shown) for ejecting the tape cassette 12 is turned ON. When the discrimination result in the step S11 is YES, a step S12 supplies to the motor driving circuit 49 a signal for rotating the drive motor 36 in a cassette ejecting direction, and the drive motor 36 is rotated in a direction opposite to that at the time of the cassette insertion. Due to the rotation of the drive motor 36 in the cassette ejecting direction, the rotary arm 30a rotates counterclockwise and the slide member 24 moves upwardly in the direction Y2 along the L-shaped guide grooves 19a and 19b to the insertion completion position. The slide member 24 further moves horizontally in the direction X2.

The holder 15 moves upwardly in the direction Y2 from the predetermined loading position to the insertion completion position together with the slide member 24 as the rotary arm 30a rotates counterclockwise. The holder 15 is stably moved upwardly with the bottom plate 15a maintained in the horizontal state at the cental part of the longer side of the bottom plate 15a and at the central part of the two shorter sides of the bottom plate 15a.

The contact member 42 rotates counterclockwise and is displaced upwardly when the holder 15 moves upwardly in the direction Y2. For this reason, when the tape cassette 12 is moved in the direction X2 together with the slide member 24, the contact member 42 is separated from the tape cassette 12 and will not interfere with the ejection of the tape cassette 12.

When the slide member 24 moves in the direction X2, the one side surface of the tape cassette 12 separates from the plate part 15d of the holder 15 and the release button 12a separates from the contact portion 15d2. As a result, the lid 12b is again locked in the closed state. When the slide member 24 is returned to an ejecting position shown in FIG. 3, the holding members 25 and 26 respectively slide over the sloping parts 15c3 and 15c4 and separate from the top and bottom surfaces of the tape cassette 12. Hence, the tape cassette 12 is no longer held by the holding members 25 and 26. The tape cassette 12 is ejected to such a position that the other end surface thereof projects from the inserting opening 13b.

When the tape cassette 12 is ejected, the tape cassette 12 slides within the holder 15 together with the movement of the slide member 24 in the direction X2. The tape cassette 12 is moved in the direction X2 in the state where the holding members 25 and 26 and the contact part 24d push against the tape cassette 12, but the moving direction of the tape cassette 12 is restricted to the cassette ejecting direction X2 by the projecting pin 18 which fits into the groove 12c of the tape cassette 12. Hence, the tape cassette 12 does not positionally deviate from the cassette ejecting direction X2 and is ejected through the inserting opening 13b.

In addition, when the tape cassette 12 is ejected, a pin 30a2 of the rotary arm 30a makes contact with and rotates the lid opening lever 44 clockwise so as to open the lid 31 while the tape cassette 12 is moved upwardly from the predetermined loading position to the insertion completion position. Hence, the lid 31 is open when the tape cassette 12 is ejected, and the tape cassette 12 is ejected through the inserting opening 13b without being interfered by the lid 31.

When the tape cassette 12 is ejected, the cam part 30b1 of the drive transmitting mechanism 30 rotates in a direction opposite to that at the time of the cassette insertion, that is, counterclockwise in FIG. 3. As shown in FIG. 3, the cam part 30b1 makes contact with the contact piece 35a of the motor switch 35 and closes the motor switch 35 when the tape cassette 12 is ejected.

As shown in FIG. 8B, a step S12 rotates the drive motor 36 in the cassette ejecting direction and a step S13 discriminates whether or not the light emitted from the lamp 45 is detected by the start sensor 46, that is, whether or not the start sensor 46 is turned ON. When the tape cassette 12 moves upwardly in the direction Y2 from the predetermined loading position, the tape cassette 12 separates from the lamp 45. Hence, the discrimination results in the steps S13 and S14 become YES, and a step S15 discriminates whether or not the motor switch 35 is ON. When the discrimination result in the step S15 is YES, a step S16 supplies the stop signal to the motor driving circuit 49 to stop the rotation of the drive motor 36.

Further, the present invention is not limited to these embodiments, but various variations and modifications may be made without departing from the scope of the present invention.

What is claimed is:

1. A tape cassette loading and unloading apparatus for loading and unloading a tape cassette in and from a recording an/or reproducing apparatus, said tape cassette having an approximately rectangular parallelepiped shape with top and bottom surfaces respectively having a longer side and a shorter side and a lid provided on a front of the tape cassette along a longitudinal direction thereof for protecting a tape accommodated within the tape cassette, said tape cassette loading and unloading apparatus comprising:

a frame;
   holder means movably provided within said frame for receiving and moving the tape cassette which is inserted into said holder means, said holder means comprising a holder for receiving the tape cassette which is inserted into said holder means, a slide member slidably coupled to said holder, said slide member being movable horizontally between a cassette receiving position where said holder receives the tape cassette and an insertion completion position and being movable vertically between said insertion completion position and a predetermined loading position, said tape cassette being partially inserted into said holder in the longitudinal direction of the tape cassette so as to push said slide member slightly past said cassette receiving position toward said insertion completion position, said slide member moving said holder vertically between upper and lower positions of said holder as said slide member moves vertically between said insertion completion position and said predetermined loading position;
   moving means for moving said slide member horizontally to said insertion completion position and then to said predetermined loading position during a tape cassette loading mode in response to insertion of said tape cassette slightly past said cassette receiving position, and for moving said slide member from said predetermined loading position to said cassette receiving position via said insertion completion position during a tape cassette ejecting mode, said moving means and said slide member being provided exclusively on one side part of said frame;
   a movement synchronizing mechanism for maintaining said holder in the horizontal state with a plurality of arms when said holder moves vertically;
   holding members provided on said slide member for respectively holding the top and bottom surfaces of said tape cassette while said slide member is moved, said holding members being separated from the top and bottom surfaces of said tape cassette in said cassette receiving position and holding the top and bottom surfaces of said tape cassette in said insertion completion position and in said predetermined loading position; and
   a lid opening member integrally provided on said frame for engaging the lid of the tape cassette and opening the lid as said slide member is moved from said insertion completion position to said predetermined loading position.

2. A tape cassette loading and unloading apparatus as claimed in claim 1 in which said holder comprises a projecting pin on a bottom plate thereof for engaging a groove formed on the bottom surface of the tape cassette and for guiding the tape cassette when said tape cassette is inserted, said groove being provided at a position offset from a center of the shorter side of the tape cassette.

3. A tape cassette loading and unloading apparatus as claimed in claim 1 in which said frame integrally comprises a contact portion projecting in a direction opposite to a cassette inserting direction in which the tape cassette is inserted for maiking contact with and pushing a lock release button of the tape cassette when said slide member is in said insertion completion position, said lock release button being provided on said one side surface of the tape cassette and releasing the lid from a locked state when pushed so that the lid can be opened by said lid opening member.

4. A tape cassette loading and unloading apparatus as claimed in claim 1 in which said movement synchronizing mechanism comprises a plurality of arms for linking three positions on said holder, said three positions being respectively located at a central part of one shorter side of a bottom plate of said holder, a centrak part of one longer side of the bottom plate of said holder, and a central part of another shorter side of the bottom plate of said holder.

5. A tape cassette loading and unloading aparatus as claimed in claim 1 in which said holder comprises a top plate which faces the top surface of the inserted tape cassette, a bottom plate which faces the bottom surface of the inserted tape cassette, and a side plate which faces a rear of the inserted tape cassette and connects said top and bottom plates so that said holder substantially has a sideways U-shape cross section when viewed in said cassette inserting direction.

6. A tape cassette loading and unloading apparatus as claimed in claim 1 in which said holder comprises an opening in a part thereof facing the lid of the inserted tape cassette, so that the tape accommodated within the tape cassette can be drawn out from the tape cassette which is within said holder in the lower position so as to perform a tape loading operation.

7. A tape cassette loading and unloading apparatus as claimed in claim 1 which further comprises a pushing mechanism provided on said frame for pushing the top surface of the tape cassette when said holder is in said lower position.

8. A tape cassette loading and unloading apparatus as claimed in claim 7 in which said pushing mechanism comprises a rotatable member for rotating to a position to make contact with the top surface of the tape cassette when said holder moves from the upper position to the lower position, and an urging member for urging said rotatable member to rotate so that said rotatable member makes contact with and pushes against the top surface of the tape cassette which is within said holder in the lower position.

9. A tape cassette loading and unloading apparatus as claimed in claim 8 in which said rotatable member has a reflective lower surface on which an image of a remaining roll of tape on a supply reel of the tape cassette is projected when said holder is in the lower position.

* * * * *